United States Patent
Reddy

(10) Patent No.: US 8,723,352 B2
(45) Date of Patent: May 13, 2014

(54) SYSTEMS FOR OPTIMIZING WAVE ENERGY FOR RENEWABLE ENERGY GENERATION

(76) Inventor: Nanda Gopal Kumjula Reddy, Madras (IN)

( * ) Notice: Subject to any disclaimer, the term of this patent is extended or adjusted under 35 U.S.C. 154(b) by 265 days.

(21) Appl. No.: 13/439,420

(22) Filed: Apr. 4, 2012

(65) Prior Publication Data

US 2012/0280504 A1    Nov. 8, 2012

(30) Foreign Application Priority Data

May 4, 2011   (IN) .................... 1545/CHE/2011/IND

(51) Int. Cl.
   *F03B 13/10*   (2006.01)
(52) U.S. Cl.
   CPC ..................... *F03B 13/10* (2013.01)
   USPC .............................. 290/53; 290/54
(58) Field of Classification Search
   CPC ........ F03B 13/142; Y02E 10/38; Y02E 10/32
   See application file for complete search history.

(56) References Cited

U.S. PATENT DOCUMENTS

| | | | | |
|---|---|---|---|---|
| 5,027,000 A | * | 6/1991 | Chino et al. | 290/53 |
| 5,191,225 A | * | 3/1993 | Wells | 290/53 |
| 5,211,545 A | * | 5/1993 | Stornes | 417/330 |
| 5,461,862 A | * | 10/1995 | Ovadia | 60/641.9 |
| 7,830,032 B1 | * | 11/2010 | Breen | 290/53 |
| 2012/0248777 A1 | * | 10/2012 | Ikemura | 290/54 |

* cited by examiner

*Primary Examiner* — Tho D Ta
(74) *Attorney, Agent, or Firm* — King & Spalding LLP

(57) ABSTRACT

A system for optimizing wave energy for renewable energy generation in onshore and offshore platforms is disclosed. In certain exemplary embodiments, wave energy from waves in an onshore platform enters or exits an air-tight chamber causing the air within the chamber to vent in or out via air-vents, and through the unidirectional turbine blades. The turbine rotates in a single direction causing an attached low speed axle to rotate as well. The low speed axle couples to a high speed axle via a step-up gearbox increasing the angular velocity of the axle. The high speed axle couples to a pump for suction of momentum transfer fluid from a tank and distribution of the fluid to a series of parallel evenly spaced, horizontal generator turbines, each with a differential pressure valve for differential inlet. The generator turbines connect to an AC or DC generator for power generation.

22 Claims, 6 Drawing Sheets

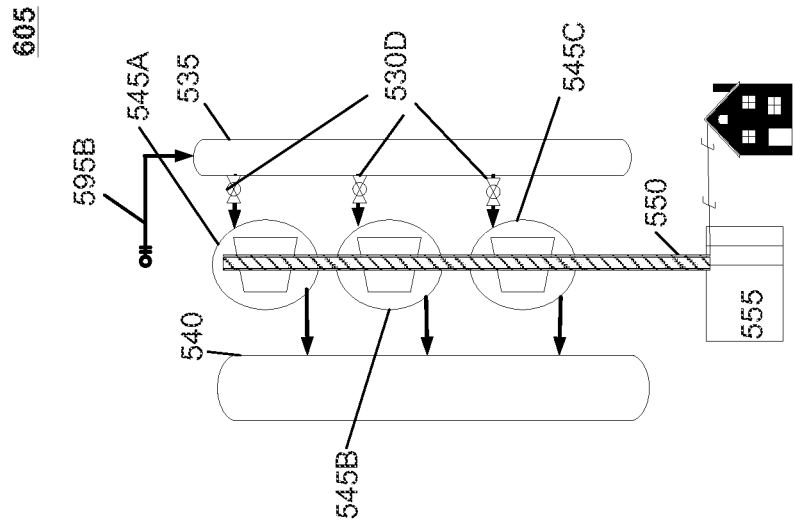
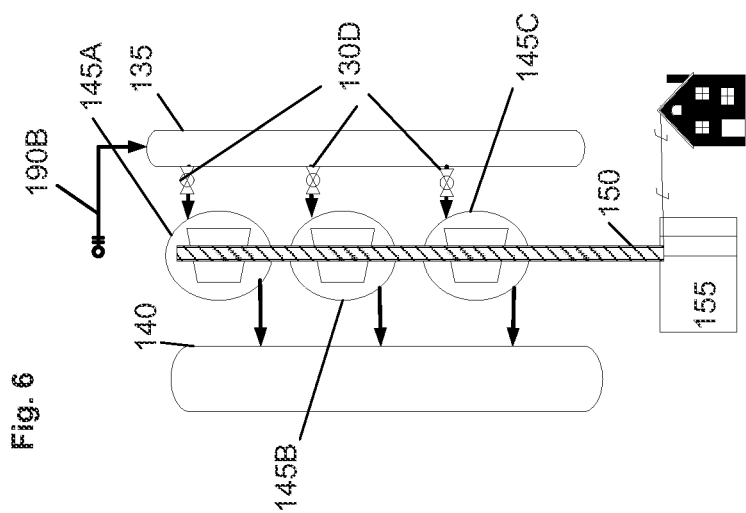
Fig. 6

SYSTEMS FOR OPTIMIZING WAVE ENERGY FOR RENEWABLE ENERGY GENERATION

RELATED APPLICATION

This application is related to, cross-references, and claims priority from Indian Patent Application number 1545/CHE/2011 filed with the Indian Patent Office on May 4, 2011, the disclosure of which is incorporated by reference herein.

TECHNICAL FIELD

The present invention relates generally to renewable energy generation and, more specifically, to systems for optimizing wave energy for generation of renewable energy in offshore and onshore structures.

BACKGROUND

Harnessing of energy from various renewable sources, including wind energy, wave energy, and ocean thermal energy includes the use of onshore and offshore wind energy and/or ocean-energy platforms to tap better wind/wave profiles for efficient clean energy production. The two main variations of ocean currents that typically interact to generate waves are tidal currents and marine currents. Water temperature differences in the ocean's water layers are mainly responsible for marine currents, while tidal currents are primary caused by the moon's gravitational effect on earth. Both currents are typically predictable, the tidal current, based on the moon's location relative to earth as it rotates around the earth, and earth's rotation that determines the marine currents.

Ocean waves typically carry anywhere between 8000-80,000 TWh/yr (Terawatt hour per year) of wave energy according to theoretical estimates, from all global ocean resources. However, certain areas, like in Europe for example, the actual technical electricity production may vary between 130 to above 1000 TWh/yr. Current estimate places that the average measurement of energy stored in ocean waves is about 10 to 50 KW (Kilowatt) for every meter height of the wave crests.

Improvements to turbine design in current wave energy converters is the key focus of most research over the past decade, including focus on one such turbine, the "wells turbine". The wells turbine is a unidirectional flow turbine that rotates in a single direction irrespective of the wave direction. A key challenge with wave energy generators is that the ocean wave enters and exists with varying forces, at different velocities. Such devices as the oscillating water column (OWC) for ocean wave trapping methods is another focus of wave energy research, which has been progressing since the early 1980s. However, the OWC is limited to the capability of the turbine, which in turn has its limitations related to the state of the wave flow rate.

Further, better valve control methods contribute to improvements in the flow rate and air pressure from the incoming and exiting wave cycle. However, the valves provide irregular and non-linear flow rates as a result of the air flow turbulence generated when cross-sectional mismatch occurs in the chamber intake areas. Potential work is in progress in terms of location issues, for the wave energy trapping structures, in the interest of maximizing balance issues with wave thrust and captured potential. Balance of offshore structures is a focus of current research, where control methods maintain stability during the harnessing process, without substantial dampening of waves during harnessing and reasonable dampening of waves during stormy weather to protect the structure. Such control and absorption methods still face problems as a result of issues in the direction of attack presented by ocean waves, and the varying nature of weather cycles. Further, conventional systems are exposed to salt-water which corrodes most of the equipment and increases the need for continuous maintenance of a power generation system.

SUMMARY

In certain exemplary embodiments, a system for optimizing wave energy for generation of renewable energy on onshore and offshore platforms comprises a step-up gearbox coupled to receive a low speed axle from an external turbine, wherein the gearbox comprises step-up gears and a high speed axle to step-up the input angular velocity from the low speed axle to a high angular velocity; a fluid pump coupled to the high speed axle, for using the high angular velocity of the high speed axle to suction a momentum-transfer fluid from a momentum-transfer fluid source; a plurality of evenly-spaced delivery pipelines in a single horizontal plane, wherein each delivery pipeline horizontally neighbors other delivery pipelines and wherein each delivery pipeline comprises a differential pressure valve for allowing a pre-determined input pressure of the suctioned momentum-transfer fluid to one of a plurality of generator turbines; and the plurality of generator turbines connected to at least one DC or at least one AC generator for conversion of the angular velocity from each of the generator turbines to electricity.

In certain exemplary embodiments, a system for optimizing wave energy for generation of renewable energy on onshore and offshore platforms comprises an anchored base platform comprising an input welts turbine within a air-tight chamber, the chamber sealed on one side by sea-water from an open sectioned inlet under the mean sea level, wherein the air-tight chamber comprises atmospheric air from air vents above the chamber; a unidirectional turbine with symmetrical blades and a low speed axle for rotation in a single direction, wherein the turbine and the low speed axle is rotated as a result of the change in the air pressure in the air-tight chamber; a step-up gearbox coupled to receive the low speed axle from the unidirectional turbine, wherein the gearbox comprises step-up gears and a high speed axle to step-up the input angular velocity from the low speed axle to a high angular velocity; a fluid pump coupled to the high speed axle, for using the high angular velocity of the high speed axle to suction a momentum-transfer fluid from a momentum-transfer fluid source; a plurality of evenly-spaced delivery pipelines in a single horizontal plane, wherein each delivery pipeline horizontally neighbors other delivery pipelines and wherein each delivery pipeline comprises a differential pressure valve for allowing a pre-determined input pressure of the suctioned momentum-transfer fluid to one of a plurality of generator turbines; and the plurality of generator turbines connected to at least one DC or at least one AC generator for conversion of the angular velocity from each of the generator turbines to electricity.

BRIEF DESCRIPTION OF THE DRAWINGS

FIG. 6 illustrates a plan view of series-connected generator turbines, Kaplan turbines, or hydraulic motors in a single horizontal plane, in accordance with certain exemplary embodiments.

DETAILED DESCRIPTION OF EXEMPLARY EMBODIMENTS

Overview

Figure 1:
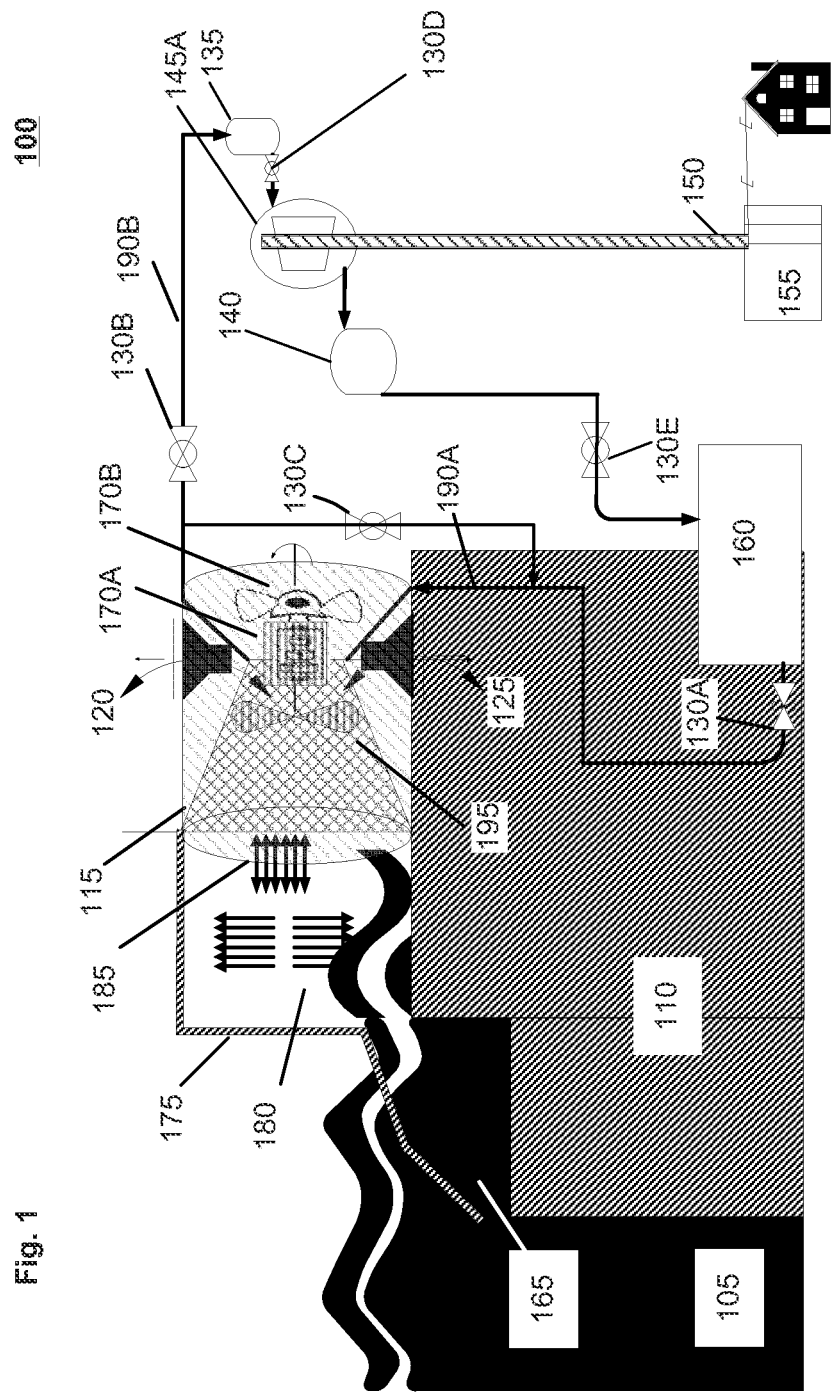
FIG. 1 illustrates a cross-section elevation of system for optimizing generation of renewable energy from ocean wave energy in onshore structures using fresh water as a momentum-transfer fluid in accordance with certain exemplary embodiments.

The methods and systems described herein enable optimizing generation of renewable energy from ocean wave energy in both, offshore and onshore structures. In certain exemplary embodiments, an offshore or onshore wave energy generation structure includes an input turbine stage with an air-tight chamber, a conical duct, and a unidirectional turbine, where the air-tight chamber is enclosed in all directions, with an opening to the sea at a pre-determined depth, the sea forming a literal sealing layer to the chamber inlet. The air-tight chamber typically allows air entry via air vents into the chamber when the waves retreat, but the same air is pushed out through the air vents when the waves flow into the air-tight chamber. Only water entry is permitted at the air-tight chamber's intake, where the entry of air is restricted via the water seal, which provides complete closure to the air-tight chamber. The chamber's intake area is preferably at a certain depth below the average water height, thereby taking into consideration any tidal height variations as a result of natural tide changes. Such an arrangement allows the transfer of wave energy into kinetic energy of the trapped air in the air-tight chamber, where the crests and troughs of the waves pressurize and/or de-pressurize the air within the chamber at regular intervals. The pressurization/de-pressurization of the chamber causes the kinetic energy of the air to rotate the blades of the unidirectional turbine. The air present in the chamber is compressed and de-compressed as a result of the continuous differential air pressure caused by the moving waves. The air-tight chamber includes an air vent fabricated to allow the entry of air into the air-tight chamber during the wave exit (suction) cycle and exit of air out of the chamber via the unidirectional turbine blades, during the wave entry (power) cycle, thereby forcing the unidirectional turbine to continue to rotate during each cycle of the waves.

The wave's kinetic energy enables the rotation of the unidirectional turbine, which in turn connects to a step-up gear-shaft (or axle) in a gear-box that converts the low speed shaft rotation of 15 and 30 revolutions per minute (rpm) to a high speed gear rotation of about 1500 rpm. In certain exemplary embodiments, the high speed gear-box includes gear controls of varying tooth numbers and a clutch arrangement for automatically controlling the gear-box output in terms of rpm, thereby providing one level of stability to the system. In certain exemplary embodiments, an axial flow water pump couples to the high-speed gear-shaft through a suction pipeline; this provides suction from a momentum-transfer fluid source (e.g., tank) located below the floor level of turbine. A foot valve provides regulation to the momentum-transfer fluid in the tank.

In certain exemplary embodiments, the momentum-transfer fluid is a liquid medium including fresh water, ocean water, or hydraulic oil. Accordingly, the fluid component in the momentum-transfer fluid can determine the type of pump and configuration that is used to generate energy. In an exemplary embodiment, where the fluid is hydraulic oil, a hydraulic pump for suction draws from a low pressure pipeline connected to a hydraulic oil tank. The hydraulic oil tank may be placed at a pre-determined height above the hydraulic pump, where the height is determined to counter-act any pressure loss in the pressurized system hydraulic oil system. A non-return valve may be fitted at the outlet of the hydraulic oil tank to retain directional pressure in the system.

In certain exemplary embodiments, the nature of the momentum-transfer fluid also determines the type of foot valve applicable to this system structure herein. The foot valve is an anti-siphon valve, fixed at the end of the suction piping that prevents fluid from completely draining out of the suction end. In an exemplary application of fresh water as a momentum-transfer fluid, the suction process may require the retention of fresh water in the pipeline, where the water promotes suction for re-starting without priming requirements. The suction pump functions due to a pressure difference within the suction piping and the fresh water tank. The foot valve retains some water in the pipe to promote the pressure different during a fresh start.

In certain exemplary embodiments, the pump's design supports suction of fluid from a momentum-transfer fluid tank located at a depth of up to 10 meters below the designed level of the platform on which on the unidirectional turbine and the generator turbines are fixed. The fluid then flows from the tank, through a main supply pipeline, to a number of generator turbines arranged in parallel in the same horizontal plane as neighbors. The main supply pipeline includes evenly spaced horizontal pipeline branching, herein referred to as a subsidiary pipelines, for each generator turbine, connecting each parallel generator turbine to the main supply pipeline. The horizontal pipeline branching is in a horizontal plane with respect to the earth's flat surface and each subsidiary pipeline horizontally neighbors other subsidiary pipelines, thereby minimizing velocity differences along the generator turbines and turbulence in the flow of the fluid stream.

The design on the subsidiary pipeline includes horizontally aligned, staged decreasing pipeline diameter from the main supply pipeline to each generator turbine. Each of the horizontal subsidiary pipelines further includes a differential pressure valve at the junction of the main supply pipeline and the subsidiary pipeline, where the valves control the settings for different pressure conditions at the entry of the momentum-transfer fluid into each subsidiary pipeline. In certain exemplary embodiments, feed-forward and feed-back instrument control systems monitors and controls the differential pressure valves to provide variable control on the subsidiary inputs based on the pressure variations of the main supply pipeline. Generally, the earth's flat surface is typically referred to as being horizontal, while anything projecting out of the earth's flat surface towards the sky is typically vertical with respect to the horizontal.

In certain exemplary embodiments, a fast-learning algorithm applies to the feedback/feed-forward valve control systems for adjusting the pressure settings at the input on each of the subsidiary pipeline. In an example of a fast-learning algorithm, one application for monitoring and controlling a feedback/feed-forward valve system is a neural networks combination with a fuzzy logic algorithm and a database of historic values of valve control and differential pressure. Continuous real-time training of the neural network can create a system with automatic responses to pressure changes in the main supply pipeline, using historic manual/automatic control values of the differential pressure valves at the subsidiary pipelines. The fast-learning algorithm is capable of automatic controls to minute pressure changes within the main supply pipeline. In certain exemplary embodiments, the main supply pipe from the momentum-transfer fluid tank is fitted with staged pipes of decreasing diameter to retain pressure within the pipeline till the subsidiary pipeline differential pressure valves. The parallel connection of the multiple generator turbines enables the feeding of the generator turbines from the main supply pipeline at different pre-determined pressures.

In another exemplary embodiment, the differential pressure valve is set to allow entry of momentum-transfer fluid into the generator at a pre-determined pressure level. Accordingly, the fluid in the main supply pipeline continues to flow till it encounters a differential pressure valve at one of the parallel subsidiary pipelines, where the encountered differential pressure valve includes an allowance for the current fluid flow pressure. The differential pressure value allows the momentum-transfer fluid into the subsidiary pipeline and to the generator turbine for only as long as the waves supply the unidirectional turbine with sufficient intake and suction to maintain a pre-determined pressure difference within the main supply pipeline and the subsidiary pipelines. The valve may shut thereafter, forcing the fluid to continue along the main supply pipeline to the next parallel subsidiary pipeline.

A DC (direct current) generator couples to the generator turbines to provide the final generation of electric power that enters the supply gridlines. An alternating current (AC) generator may be used with electric design modifications to support the generator turbines. The spent momentum-transfer fluid drained from the generator turbines discharges to a low pressure large diameter discharge pipe. In certain exemplary embodiments, the spent momentum-transfer fluid is water cooled using a heat-exchanger or hydraulic oil cooler and maintained at between 45° C. and 55° C. with the help of an automated thermostat monitor. The discharge pipe feeds the discharged fluid back into the momentum-transfer fluid tank for re-use within the system. A base step-up transformer may step-up the voltage to transmission specifications as determined by the country and municipalities where the onshore system is resident. In certain exemplary embodiments, the system disclosed herein can be implemented in an offshore platform anchored to the sea-bed, or a within a floating system. A floating system may include ships with modified capability for internal energy requirements. Alternatively, certain exemplary embodiments disclosed herein can apply to a floating platform with provisions for stabilizing the platform in high wave situations.

In certain exemplary embodiments, the system disclosed herein implements a salt water pump system to suction seawater as momentum-transfer fluid directly from an open water source, like the sea (momentum-transfer fluid source). An ocean wave energy driven wells turbine connected to a high speed gear box powers the pump, where the pump transfers the salt water to tank storage at a height of about 20 meters. The exemplary height setting allows the salt-water to store potential energy from the gravitational force which follows the free-flow (or accelerated flow) of the water into a low pressure Kaplan turbine located at the suitable height above the base of ground level base of the wells turbine. The spent salt-water from the Kaplan turbine may then flow back into the sea. Further, the height of 20 meters is illustrative, where the tank storage height may vary depending on geographic conditions of the area, such as the soil and architecture limitations, as well as the type of Kaplan turbine used in the system, and the wave velocity in the area of the wells turbine structure.

Wave energy and power density are terms associated with wave energy, where the power flux of the wave is the wave energy per period wave cycle. Eq. (1) shows the energy density, where 'ρ' stands for the density of water (seawater for purposes of this disclosure), which is about 1025 Kg/m³, 'g' is the gravitational force at 9.8 meter/sec² relationship between energy density, and 'h' is the height of the wave (includes the bottom of the trough and the top-most point of the crest).

$$\text{EnergyDensity}(E,t) = \rho g h^2/8 \qquad \text{Eq. (1)}$$

$$\text{EnergyFlux} = \text{RateOfChangeOfEnergyDensity} \qquad \text{Eq. (2)}$$

$$\text{EnergyFlux}(Pt) = dEt/dt \qquad \text{Eq. (3)}$$

½*h is half the amplitude of an absolutely perfect wave, which may resemble a sine wave. The half-amplitude of a wave may literally be the water surface in a wind-free situation and is generally the mean sea level. '$E_t$' or the Energy Density measurements may be in terms of Joules per meter². The product of the Energy Density ($E_t$) and the velocity of the wave face is the energy flux, sometimes referred to as energy density, as measured per meter of a wave's striking surface. The term "Celerity" refers to the velocity or phase speed of the wave face and eq. (4) shows the how the celerity is affected by the wavelength of the wave.

$$C\sqrt{(g\lambda/2\pi)} * \tanh*(2\pi d/\lambda) \qquad \text{Eq. (4)}$$

Where, in Eq. (4), 'C' is celerity, is the gravitational force, 'λ' is the wavelength, and 'd' is the depth of the water at the moment of impact. The unit for 'C' is meters/second, while wavelength is in meters; depth is in meters below the mean sea level. Further, Eq. (5) determines 'λ' (wavelength), where 'T' is the time period of the wave in seconds.

$$\lambda = gT^2/2\pi \qquad \text{Eq. (5)}$$

Further, the depth of the wave, as shown in Eq. (4) has an impact on the celerity of the wave. Steepness is a measure of the wave height (h) to wavelength (λ) ratio for the water surface. In shallow water, with depths of about 15-20 meters (50-65 ft), the estimates place that an individual wave breaks at a steepness of greater than about 0.7. However, in deeper water of about 25 m (82 ft), if the ratio of wave 'h' to 'λ' exceeds about 0.15, the steepness of the water surface is sufficient to break into wave segments. Accordingly, the exemplary embodiments described herein are applicable in different water depths at deep offshore areas as well as in relatively shallower onshore areas.

The wave face carries an estimated energy flux per meter that can be measure using Eq. (6). Combining Eq. (4) and (6) provides as estimate of the potential renewable wave energy for generation in Watts/meter at a chosen generation site prior to installation.

$$\text{EnergyFlux}(Pw) = C*Et = C*\rho g h^2/8 \qquad \text{Eq. (6)}$$

In a similar air-tight chamber, or any similar structure, the power (in Watts) delivered to the unidirectional turbine via the air-tight chamber inlet is measure as shown in Eq. (7). Eq. (7) may be applicable to improvements made in the unidirectional turbine and air-tight chamber inlet design to reduce chamber inlet interference, while maintaining structural integrity during storm seasons. Further, in a moving vessel, or a non-stationary type offshore platform, the application of the turbine changes into a horizontal floating type wells turbine, or a similar turbine, with added stability features. However, additional calculation may be required to consider the direction of waves and the direction of motion of the generating platform. In Eq. (7), 'Pressure$_{turbine}$' is the pressure at the duct of the unidirectional turbine, at the entry of the conical structure hosting the turbine, measured in Newton/meter$^2$, 'ρ' is the air density in kilograms/meter$^3$, 'A$_{turbine}$' is the turbine duct area, and 'V$_{air}$' is the airflow speed at the unidirectional turbine inlet, in meters/second.

$$\text{ChamberPower} = \text{Pressure}_{turbine} + \rho_{air} V_{air}^2/2) * V_{air} A_{turbine} \quad \text{Eq. (7)}$$

In a floating type platform may require consideration of several new factors, including the forces acting on the platform the angle of the striking waves, wave and wind induced turbulence of the wave front, movement of the platform (including velocity of vertical movement), and displacement of the water depth during the vertical movement. The power generated in the platform is more complex, and with stabilizer for a floating type platform, will still require a measure of the induced depth in the platform as a wave strikes the platform. Assuming that the direction of the strike is 'positive', or against the face of the chamber mouth, then the striking force is positive and is included in the calculations show in Eq. (8). Alternatively, a dynamic approach for calculating the resultant force uses hydrodynamics, to determine the angular components of the applicable forces, where the components are then set to balance the total forces in a wave-energy-platform setting, In Eq. (8), 'ρ$_{water}$' is the density of the sea water, 'H' is the height of the wave, 'A$_{inlet}$' is the area of mouth (or inlet) of the floating platform, 'l$_{induced}$' is the length of the induced depth of the platform, and 'T' is the time period of the induced depth. However, it may be prudent to apply the dynamics and angular variation of the floating platform's change as a result of a wave strike. Eq. (8) is an exemplary simple derivation that may be incorporated while designing the floating platform, and selecting the appropriate deployment site. Further, in a fixed site, tied via anchors to the sea-bed, a direct equation may be applicable as shown in Eq. (7), or adoption of Eq. (8) show below, without the induced depth velocity measurement may be reasonable.

$$\text{FloatingPowerGenerated} = (2\rho_{water} h A_{inlet} g l_{induced})/T \quad \text{Eq. (8)}$$

Architecture and Examples

Although specific exemplary embodiments have been described in detail herein, the description is merely for purposes of illustration and in alternative embodiments, certain steps can be performed in a different order, in parallel with one another, omitted entirely, and/or combined between different exemplary embodiments, and/or certain additional acts can be performed, without departing from the scope and spirit of this disclosure.

FIG. 1 illustrates a cross-section elevation of system 100 for optimizing generation of renewable energy from ocean wave energy in onshore structures using fresh water as a momentum-transfer fluid in accordance with certain exemplary embodiments. An open mouth concrete structure or earth-based foundation 110 includes a sectional inlet 165 to the sea under the mean sea level, at a reasonable depth according to the established mean sea level in the geographic area of the structure. An earth-based foundation includes natural formations, rocks, soil, and a hardened foundation capable of supporting heavy turbine and machinery structures, while being resilient to significant natural erosion. Further, exemplary embodiments disclosed herein include considerations for the variation in mean sea level (and actual sea-water level) during various tide situations, such as high-tide and low-tide. Structure 175 is an additional concrete or corrosion proof material over concrete structure or earth-based foundation 110, with the sectioned inlet 165 set below mean sea level. The system 100 may include an extended shore-line concrete structure or earth-based foundation 110 extending along the shore-line and including multiple sectioned inlets 165 with air-tight chambers 180, all set in a series connection, in the same horizontal plane with respect to the earth's flat surface and each sectioned inlet horizontally neighbors other sectioned inlets, and in the same general area to localize the energy generation process.

The design of the inlet takes into consideration the geographic and engineering limitations discussed above, where concerns of interfering with the wave energy and structure damage from storms may apply. The damping of waves as a result of the inlet structures, such as the stepped structure shown by connecting concrete structures or earth-based foundation 110, may reduce the potential wave surface energy prior to entering the chamber. In certain exemplary embodiments, the design of the concrete structure, includes air-tight chamber 180, with the sectional inlet portion 165 sloped gently into the sea surface below the depth of the mean sea level. Design considerations may include an additional horizontal distance between the entrance 185 to the conical structure 115 housing the unidirectional turbine 195 and sectional inlet 165. This horizontal distance provides room for waves to maintain the same flow, height, and regularity as outside the chamber.

The waves from the open sea 105 strike the concrete structure or earth-based foundation 110 and subsequently reach the inlet 185 of the unidirectional turbine system 195. The sectional inlet 165 directs the waves into the air-tight chamber, while the air vents 120 and 125 open to allow exit of air trapped in the chamber and being pushed out by the incoming waves, the exit of air occurring through the unidirectional turbine blades. For the purposes of illustration in the exemplary embodiments herein, the discussion includes a single wave and extrapolation of the single wave concept is typically acceptable. The air-tight chamber includes air that was previously existent in the chamber from the previous wave sections cycled out of the chamber, thereby creating suction. The vents 120 and 125 allow air into the chamber (shown by the vent arrows), where the inlet air contributes to the angular inertia of the rotating unidirectional turbine, thereby keeping the turbine rotating, even at a lower angular velocity. New inlet waves in the air-tight chamber causes the existent air in the chamber to push out through the blades of the unidirectional turbine 195, and through the air vents 120-125, thereby making the blades rotate in the same direction, as during the suction cycle.

The unidirectional turbine 195 in conical housing 115 is coupled to, either an axial flow water pump 170 (for fresh water), a hydraulic pump (for hydraulic oil), or any time of a pump (as allowed by the momentum-transfer fluid). The axial flow water pump 170 includes high speed gear box 170A and pump structure 170B. The concrete structure or earth-based foundation 110 in system 100 supports the pump 170 at height of about 110 meters over a tank 160 holding the momentum-transfer fluid of choice, such as, fresh water in this example. The end of the suction line 190, between the pump 170 and the tank 160 is regulated by a foot valve 130A that retains some fluid when the suction within the pipeline is lost, thereby enabling the pump to start without priming. The pump 170 transfers the fluid from the tank 160 to the high pressure (small diameter) fluid distribution pipeline 135 via the main supply line 190 including valve 130B. Valve 130C may be set to monitor the pressure in the supply line 190B and supply valve 130B as a result of the changing wave forces and changing speeds of the unidirectional turbine output.

A control system implementation may monitor the statuses of valves 130A-130D. The status of valves 130B-C may be input to a feedback or a feed forward module of the control system for determination of the generator turbine choice from the multiple generator turbines arrangement 145, thereby automatically adjusting the appropriate differential pressure valves 130D for turbine selection according to fluid in the main supply line 190. The fluid distribution pipeline 135 includes a collection of evenly spaced differential pressure valves connecting to a subsidiary pipelines leading to the generator turbines 145A-C. FIG. 6 illustrates a plan view for an exemplary arrangement of the generator turbines 145A-C represented by sectional view for the generator turbine 145 in FIG. 1, where 145A-C are series connected in generator turbines in the same horizontal plane. Alternatively, the main supply pipeline 190B including valve 130B may connect directly to the multiple, evenly spaced, and horizontally fixed subsidiary pipelines leading to the generator turbines 145. The horizontally fixed subsidiary pipelines are set in a series connection, neighboring with each other in a horizontal plane with respect to the earth's flat surface.

Each subsidiary pipeline from pipeline 135 to generator turbine 145 includes a differential pressure valve 130D at the junction of the turbine and the pipeline 135. In certain exemplary embodiments, the pipeline 135 includes a system for automatic pneumatic control of the differential pressure valves 130D depending on the flow rate of the fluid from valve 130B on the side of the unidirectional turbine 190. The exemplary design of the systems disclosed herein ensures that each generator turbine 145A-C functions according to specified input fluid flow rate, while generating a fixed electrical output. The combination of valves 130B-C and the parallel connections from 145A-C ensure that the generator turbines 145 maintain a standard rotation rate, irrespective of the wave's entry/exit rates at the mouth of the air-tight chamber inlet 165.

One or more direct current (DC) generators may be coupled to the three exemplary generator turbines via connecting belt 150, where the belt 150 may be three separate connecting belts, or a single, clutch-adjustable belt for engaging one of the three generator turbines. In another exemplary embodiment, a DC generator connects to each generator turbine and a generator room, depicted by block 155 in FIG. 1 houses the entire DC generator block, including, alternatively, the multiple generator turbine arrangement. The discharged fluid from the generator turbines transfers, via a low pressure and large diameter pipeline 140, to the momentum-transfer fluid tank 160 for recycling.

Figure 2:
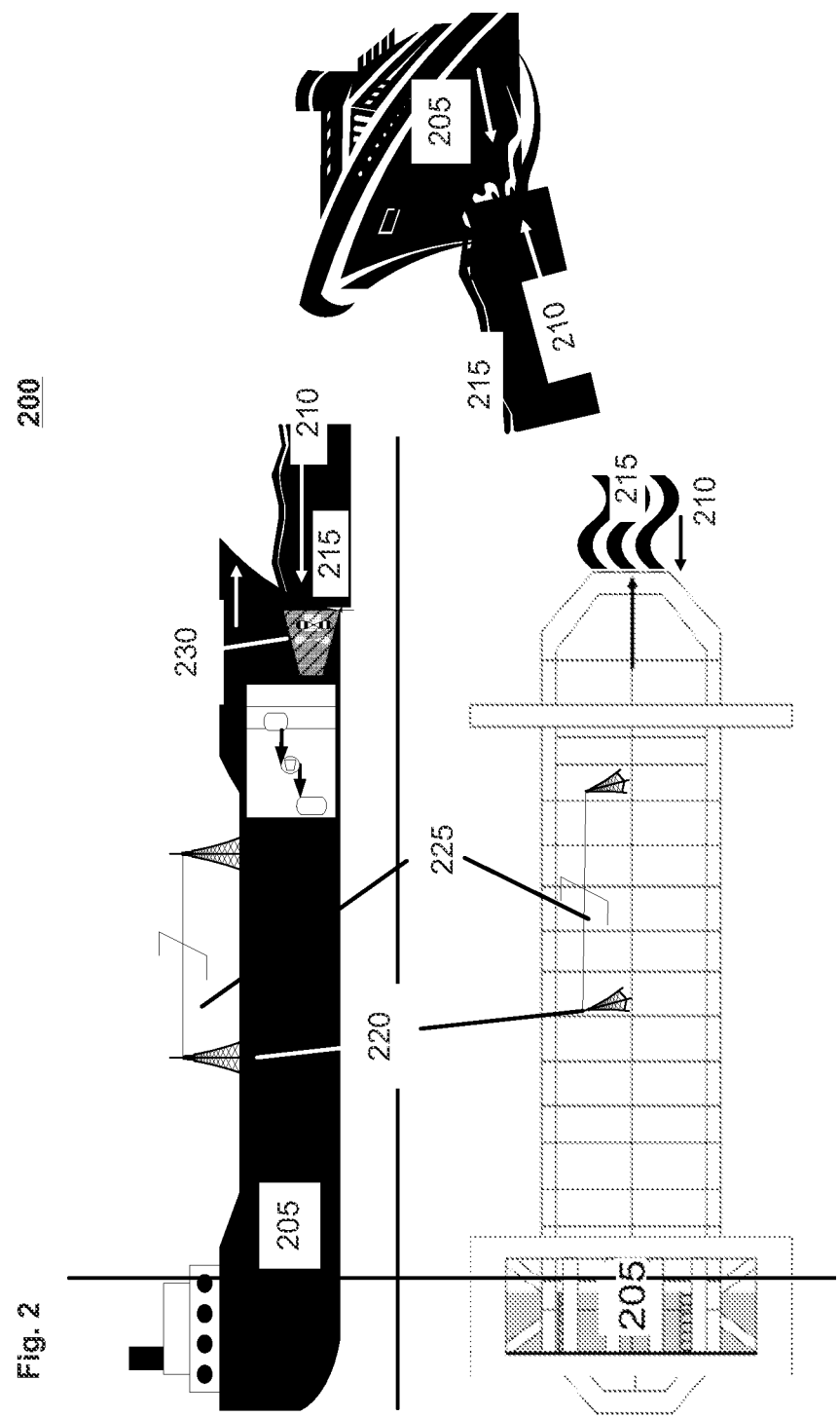
FIG. 2 illustrates an elevation view, a plan view, and an auxiliary view of a system for optimizing generation of renewable energy from ocean wave energy using offshore structures in accordance with certain exemplary embodiments.

FIG. 2 illustrates an elevation view, a plan view, and an auxiliary view of a system 200 for optimizing generation of renewable energy from ocean wave energy using offshore structures in accordance with certain exemplary embodiments. In one exemplary embodiment, a shipping vessel 205 may be adapted to function with an inlet turbine 230 at the hull level or any appropriate location below the mean sea-level of the ship. The ship 205 includes all the features disclosed in FIG. 1 for the purposes of generating electricity from the waves striking the hull of the vessel. The direction of the waves 215, in such an application, may mostly be opposite to the direction of the ship's motion. A relative velocity calculation in this application can indicate that the wave surface 215 strikes the unidirectional turbine 230 at higher entry velocity. However, the direction of the waves may not be consistent and the exemplary sectioned inlet (see FIG. 1) of the air-tight chamber may require design changes. Such design changes, in certain exemplary embodiments may include flanges for deviating rouges waves at the inlet or a transition chamber to consolidate the waves prior to entering the air-tight chamber. The transition chamber allows the waves to settle from a turbulent to a defined laminar flow prior to entry into the air-tight chamber. In certain exemplary embodiments, the relative velocity is sufficient to negate the damping from misdirected waves caused during motion of the vessel, thereby causing sufficient energy generation without the need for re-design of the inlet on the air-tight chamber.

The steepness of the waves sticking the hull of the ship 205 determines the wave energy and the wave formation. In the case of a moving platform, such as a ship 205, the waves from the water body 215 formed around the path of the ship 205 include different phase wave fronts, and different trajectories. The waves in deeper water (steepness of the water surface) with sufficient wavelength generate an angular dispersion that waves from other directions may counter and dampen. Eq. (9) discloses that for an angular velocity 'ω' of a small disturbance striking the side of the ship 205, with horizontal wave number (k), given by k=$k_x$x+$k_y$y, where '$k_x$' and '$k_y$' are the X-axis and Y-axis components of the wave number vector, and the equation for 'k' is a straight line. The derivative of 'ω' with respect to the wave number is the group velocity of the wave, Wave number is a wave property defined as a value proportional to the reciprocal of the wavelength. Accordingly, the wave number (k) may be 1/λ or 2Π/λ (where 2Π is a fixed value and has only angular effects on 'k') depending on the nature of the wave front. From Eq. (9), the group velocity Vg is half the phase velocity Vp. 'g' is the gravitational force acting on the wave at the time of impact.

$$Vg = d\omega/dk = \tfrac{1}{2}\sqrt{(g/k)} = \tfrac{1}{2}V_p \qquad \text{Eq. (9)}$$

Further, in another exemplary embodiment, as illustrated in FIG. 2, the turbine, within the air-tight chamber may be isolated outside the ship via an external streamlined attachment to the side of the ship 205. Consideration in the above equation includes deviation from normal wave expectations caused by multi-directional waves and the effect of rouge components on the intended wave cycle; hence the need for modifications to the vessel 205 may be non-existent. FIG. 2 also illustrates that a fixed sized fresh water (or oil) tank may be built within the ship, in the area of the unidirectional turbine. There can be a limited number of parallel generator turbines connected to the main supply line from the fresh water tank, thereby limiting the additional weight and complexity of the system. Further, a closed hydraulic oil system may be used instead of the fresh water system for a moving platform off-shore energy generation. A hydraulic oil turbine system is discussed below with respect to FIG. 5. However, such a fresh-water system will still maintain sufficient generation capability to power the ship alone. Transmission lines 225 transmit power after a step-up of the voltage to meeting the requirements of the different machinery on this exemplary offshore application. Additional power generated may be stored to a battery, or may support the main engine during work-load demands.

Figure 3:
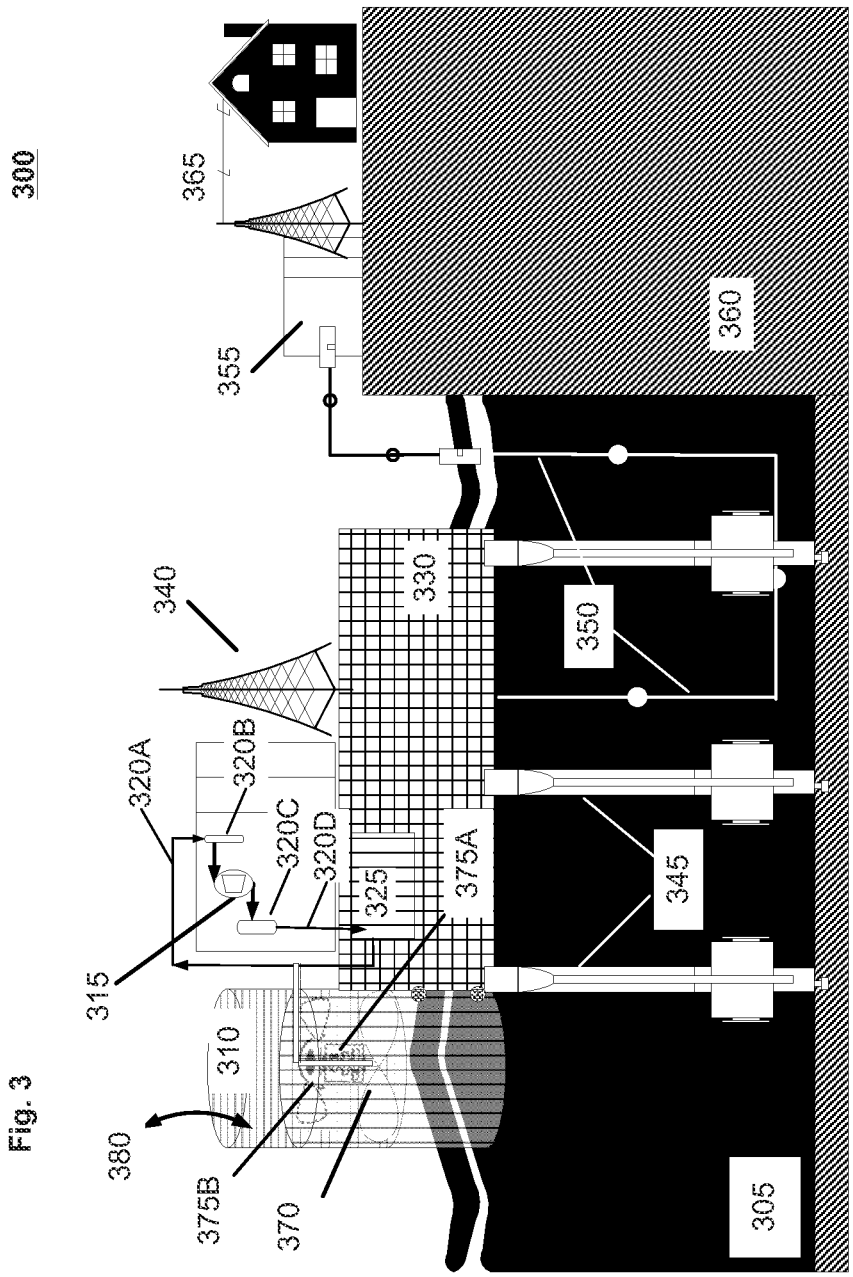
FIG. 3 illustrates a cross-section elevation of a system for optimizing generation of renewable energy from ocean wave energy in offshore structures in accordance with certain exemplary embodiments.

FIG. 3 illustrates a cross-section elevation of a system 300 for optimizing generation of renewable energy from ocean wave energy in offshore structures in accordance with certain exemplary embodiments. The rig 330 is an offshore structure that may anchor to the sea-bed via permanent rigid anchors 345, or may be temporary movable using heavy chain anchors. The rig hosts the parallel generator turbines 315, as well as, the fluid tank 325 for transferring the wave energy from the unidirectional turbine 370 to the generator turbines 315. For simplicity, in the sectional illustration of FIG. 3 only a single turbine is shown in the horizontal plane parallel to the earth's flat surface. The unidirectional turbine 370 is housed inside a cylinder structure 310 attached to the side of the rig 330. In certain exemplary embodiment, for a mobile rib 330, a closed hydraulic oil system may be used for energy generation, where hydraulic oil is the momentum transfer fluid. Such a system is discussed below with reference to FIG. 5. The motion of the rig 330 will have lesser consequence in a pressurized closed momentum fluid system as disclosed in FIG. 5. The cylinder 310 allows the waves to strike the open mouth of the cylinder 310 from the bottom, where the air, at the moment of striking, moves the unidirectional turbine blades 370 in a single pre-determined direction. The air contained in the bottom of the cylinder is pushed through the blades and out of the top of the cylinder through air vents (shown as air release 380), similar as discussed with respect to FIG. 1. The rotating unidirectional turbine 370 continues to rotate in the same direction as the waves from the sea body 305 flow out of the cylinder 310, thereby sucking air into the air vents (shown as air entry 380), through the blades, and to the space at the bottom of the cylinder created by the trough in the wave. As the process continues, the next crest pushes out the air again and the turbine maintains a rotational inertia.

The turbine connects to an axial flow pump 375B via a high speed gear-box 375A that steps-up the angular rotation of the unidirectional turbine 370 from out 30 rpm to 1500 rpm. A gear-shaft or high speed axle from the step-up gear box connects to an axial flow fresh water pump 375, or any applicable pump responsive to the fluid in the momentum-transfer tank 325. The wave energy from the sea-body waves 305 converts to angular kinetic energy of the unidirectional turbine, which is then stepped-up using a high-speed gearbox and connecting shafts, and used via an axial flow pump 375 to suction fluid from the tank 325. The suctioned fluid flows through high pressure main supply pipeline 320A and 320B to the generator turbine 315, ending back at the tank 325 via low pressure pipelines 320C and 320D. The fluid is transported via a pressure monitored main suction pipeline to an evenly distributed set of horizontal generator turbines connected to the main suction pipeline via, subsidiary pipelines and differential pressure valves. The horizontally fixed subsidiary pipelines are set in a series connection, neighboring with each other in the same horizontal plane, from the main supply pipe line. As discussed in FIG. 1, the differential pressure valves allow the fluid into select generator turbines 315 based on the pressure of the suction fluid in the main supply line. The generator turbines couple to a DC generator on the offshore platform which then generates electricity, which is stepped-up to transmission voltages and frequencies for transmission to the main land via undersea cable 350. The onshore electricity generation room depicted as block 355 receives the generated electricity and supplements the grid for supply to residential and commercial establishments via regular transmission lines 365.

Figure 4:
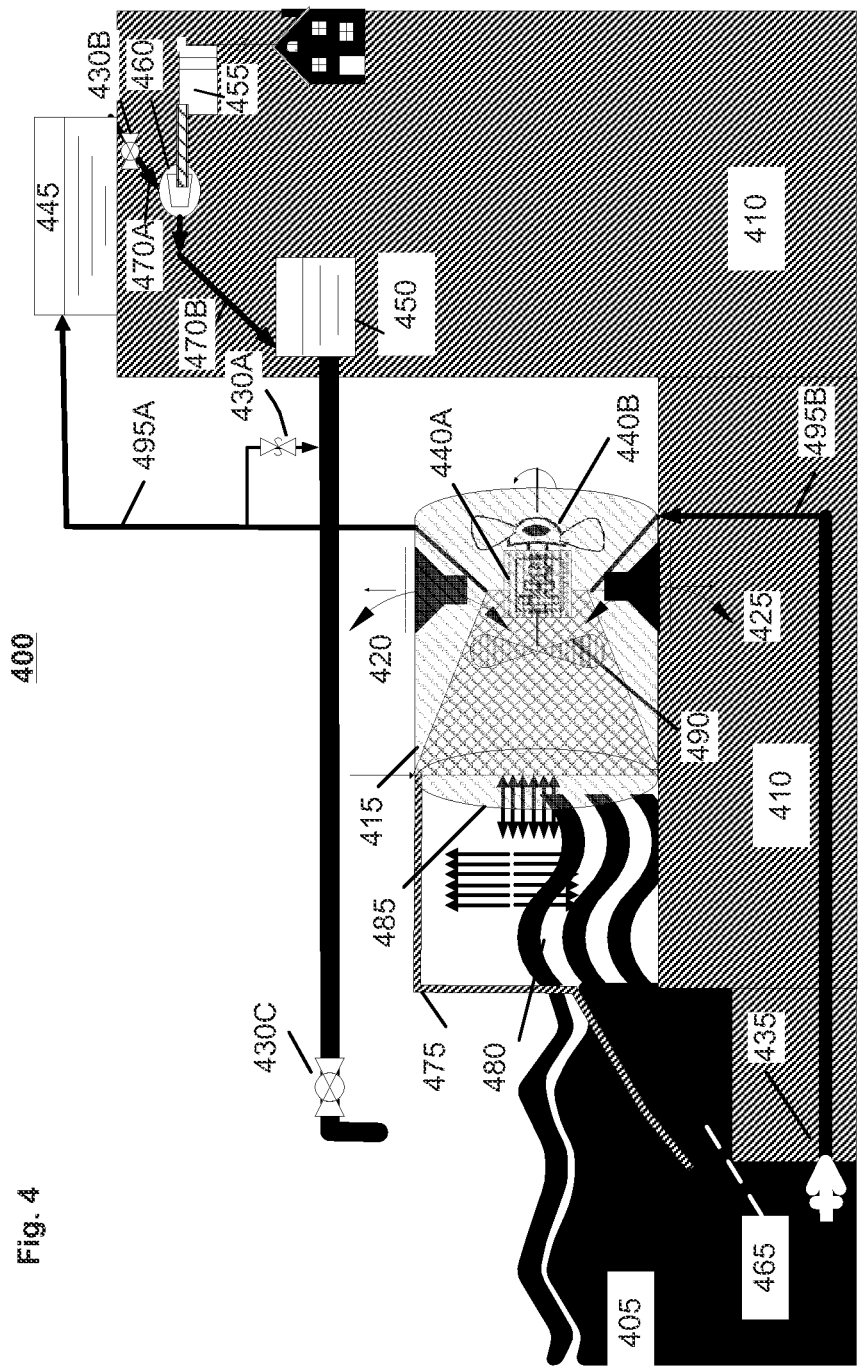
FIG. 4 illustrates a cross-section elevation of a system for optimizing generation of renewable energy from ocean wave energy in onshore structures using sea water as a momentum-transfer fluid in accordance with certain exemplary embodiments.

FIG. 4 illustrates a cross-section elevation of a system 400 for optimizing generation of renewable energy from ocean wave energy in onshore structures using sea water as a momentum-transfer fluid in accordance with certain exemplary embodiments. An open mouth concrete structure or earth-based foundation 410 includes a sectional inlet 465 to the sea 405 under the mean sea level, at a reasonable depth according to the established mean sea level in the geographic area of the structure. Further, exemplary embodiments disclosed herein include considerations for the variation in mean sea level (and actual sea-water level) during various tide situations, such as high-tide and low-tide. Structure 475 is an additional concrete or corrosion proof material over concrete structure or earth-based foundation 410, with the sectioned inlet 465 set below mean sea level. The system 400 may include an extended shore-line concrete structure or earth-based foundation 410 extending along the shore-tine and including multiple sectioned inlets 465 with air-tight chambers 480, all set in a series connection, neighboring each other in the same horizontal plane with respect to the earth's flat surface, and in the same general area to localize the energy generation process.

The design of the inlet takes into consideration the geographic and engineering limitations discussed above, where concerns of interfering with the wave energy and structure damage from storms may apply. The damping of waves as a result of the inlet structures, such as the stepped structure shown by connecting concrete structures or earth-based foundation 410, may reduce the potential wave surface energy prior to entering the chamber 480. In certain exemplary embodiments, the design of the concrete structure, includes air-tight chamber 480, with the sectional inlet portion 465 sloped gently into the sea surface below the depth of the mean sea level. Design considerations may include an additional horizontal distance between the entrance 485 to the conical structure 415 housing the unidirectional turbine 490 and sectional inlet 465. This horizontal distance provides room for waves to maintain the same flow, height, and regularity as outside the chamber.

The waves from the open sea 405 strike the concrete structure or earth-based foundation 410 and subsequently reach the inlet 485 of the unidirectional turbine 490. The sectional inlet 465 directs the waves into the air-tight chamber, while the air vents 420 and 425 open to allow exit of air trapped in the chamber 480 and being pushed out by the incoming waves, the exit of air occurring through the unidirectional turbine blades. The unidirectional turbine blades may be configured to rotate at a speed of 15 to 20 rpm (revolutions per minute), For the purposes of illustration in the exemplary embodiments herein, the discussion includes a single wave and extrapolation of the single wave concept is typically acceptable. The air-tight chamber includes air that was previously existent in the chamber from the previous wave sections cycled out of the chamber, thereby creating suction. The vents 420 and 425 allow air into the chamber (shown by the vent arrows), where the inlet air contributes to the angular inertia of the rotating unidirectional turbine, thereby keeping the turbine rotating, even at a lower angular velocity. New inlet waves in the air-tight chamber causes the existent air in the chamber to push out through the blades of the unidirectional turbine 490, and through the air vents 420-425, thereby making the blades rotate in the same direction, as during the suction cycle.

The unidirectional turbine 490 in conical housing 415 is coupled to a volute sea-water pump 440B via high speed gears 440A to pump sea-water from an inlet source 435 to storage tank 445 via main supply line 495. The high speed gears 440A may be configured to a ratio of 1:100, thereby converting the rotations from the unidirectional turbine to a maximum speed of 1500 rpm for the sea-water pump 440B. The volute sea-water pump 440B may include an in-built or separate high speed gear box 440A. The concrete or earth-based foundation 410 in system 400 supports the pump and turbine structures 485, 415, 440, 490, and 420 at height of the mean sea-level. The storage tank 445 holding the momentum-transfer fluid of choice—sea water in this example, is supported by the concrete structure 410 at a height of about 30 meters over the unidirectional turbine conical housing 415. The suction line 495A is regulated by a valve 430A. In an exemplary embodiment, the volute sea-water pump 440B transfers sea-water from the inlet main supply line 495B to the storage tank at a rate of 1200 cubic meters per hour. While the illustration of FIG. 4 shows the concrete structure earth-based foundation 410 stacked vertically, the concrete structure or earth-based foundation may be a simple sloped natural foundation horizontally separated from the conical housing 415.

A control system implementation may monitor the statuses of valves 430 in FIG. 4. The status of valves 430 may be input to a feedback or a feed forward module of the control system for determination of the generator turbine choice from a multiple generator turbines 460 arrangement, thereby automatically adjusting the differential pressure valve 430B for the flow of sea-water from the storage tank to the generator turbines 460. The multiple turbine arrangement for element 460 may be similar to the embodiments illustrated in the plan view in FIG. 6, where the generator turbines are arranged in series in the same horizontal plane. In an exemplary embodiment, the generator turbines 460 are Kaplan turbines. The vertically displaced placement of the storage tank 445 allows gravity to act on the flow of the sea-water into the generator turbines 460. Further, the concrete structure or earth-based foundation 410 may be inclined at about 8°-10° with respect to the earth's flat surface, thereby allowing the fluid from storage tank 445 to flow in a laminar manner through similarly inclined supply lines 470A-B to the Kaplan turbines 460 prior to entering a spent tank 450. Alternatively, the supply tines 470A-B may be inclined at 8°-10° with respect to the earth's flat surface, which is illustrated in FIG. 4, to generate the same laminar flow as would occur when the concrete structure 410 is inclined.

One or more direct current (DC) generators may be coupled to the exemplary Kaplan turbines via connecting belt, where the belt may be separate connecting belts for each Kaplan turbine 460, or a single, clutch-adjustable belt for engaging one of the Kaplan turbines 460. In another exemplary embodiment, a DC generator connects to each Kaplan turbine and a generator room, depicted by block 455 in FIG. 4 houses the entire DC generator block, including, alternatively, the multiple generator turbine arrangement. The discharged sea-water from the generator turbines transfers, via a low pressure and large diameter pipelines 470B and 430 to spent tank 450, and then through optional valve 430, to the open sea 405.

Figure 5:
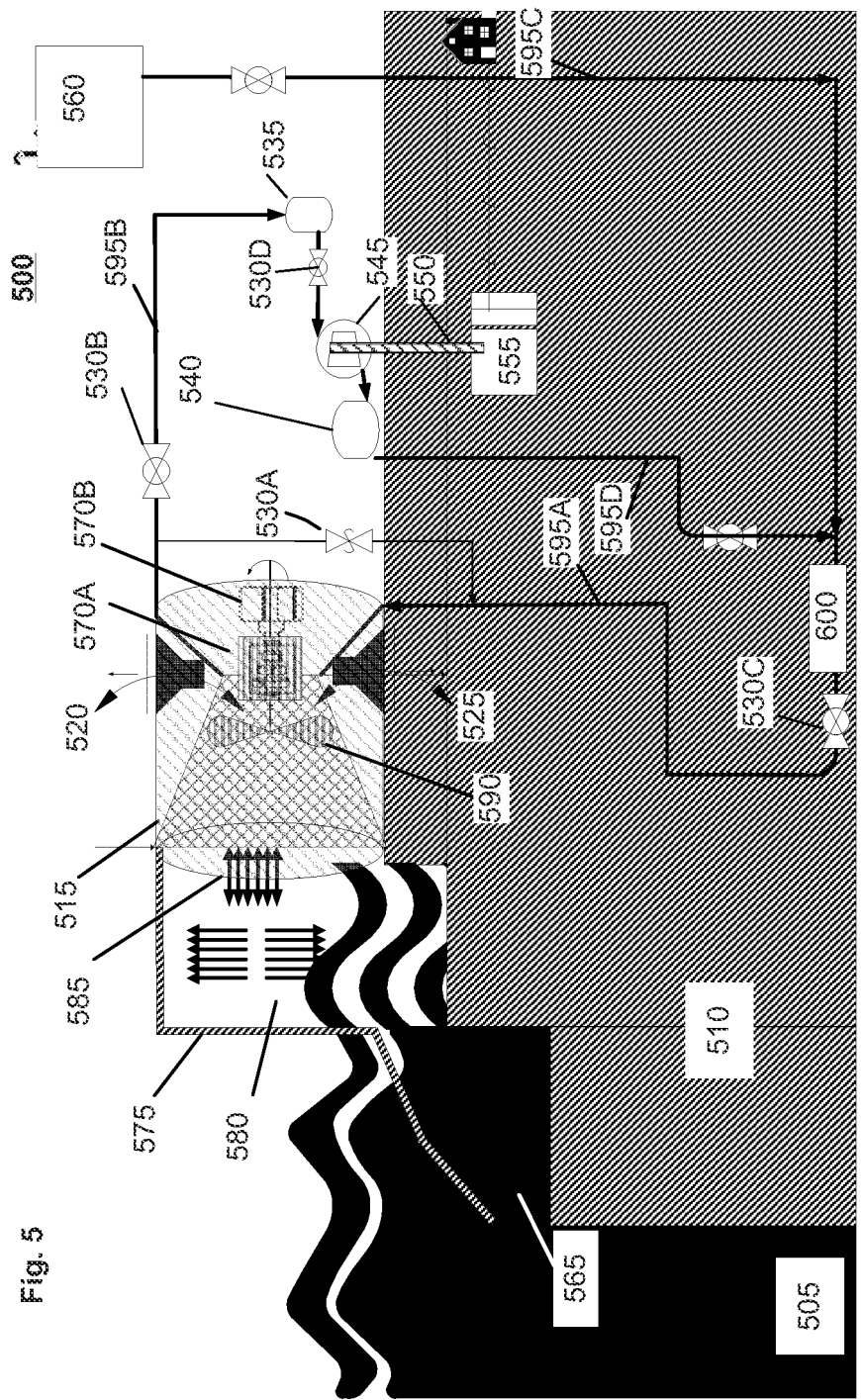
FIG. 5 illustrates a cross-section elevation of a system for optimizing generation of renewable energy from ocean wave energy in onshore structures using hydraulic oil as a momentum-transfer fluid in accordance with certain exemplary embodiments.

FIG. 5 illustrates a cross-section elevation of a system 500 for optimizing generation of renewable energy from ocean wave energy in onshore structures using hydraulic oil as a momentum-transfer fluid in accordance with certain exemplary embodiments. An open mouth concrete structure or earth-based foundation 510 includes a sectional inlet 565 to the sea 505 under the mean sea level, at a reasonable depth according to the established mean sea level in the geographic area of the structure. Further, exemplary embodiments disclosed herein include considerations for the variation in mean sea level (and actual sea-water level) during various tide situations, such as high-tide and low-tide. Structure 575 is an additional concrete or corrosion proof material over concrete structure or earth-based foundation 510, with the sectioned inlet 565 set below mean sea level. The system 500 may include an extended shore-line concrete structure or earth-based foundation 510 extending along the shore-line and including multiple sectioned inlets 565 with air-tight chambers 580, all set in a series connection, neighboring each other in the same horizontal plane with respect to the earth's flat surface, and in the same general area to localize the energy generation process.

In an exemplary embodiment, ethanol glycol or any alcohol-based fluid with properties of ethanol glycol may substitute hydraulic oil as the momentum-transfer fluid in FIG. 5. Accordingly, with ethanol glycol, the swash type hydraulic pump may not be applicable, but a volute fluid pump may be used for suction of the ethanol glycol fluid to operate the turbine generators. Ethanol glycol is a non-corrosive fluid where metal components are involved and also supports self-cooling to reduce fluid heat generated after working the turbine generators. Ethanol glycol is organic and may be compressed to a liquid form under high pressure that may be developed within a closed system as disclosed in FIG. 5. Further, ethanol glycol may function as a momentum-transfer fluid at temperatures below freezing. This aspect of ethanol glycol allows the system in FIG. 5 to function in extreme temperature conditions.

The design of the inlet takes into consideration the geographic and engineering limitations discussed above, where concerns of interfering with the wave energy and structure damage from storms may apply. The damping of waves as a result of the inlet structures, such as the stepped structure shown by connecting concrete structures or earth-based foundation 510, may reduce the potential wave surface energy prior to entering the chamber 580. In certain exemplary embodiments, the design of the concrete structure, includes air-tight chamber 580, with the sectional inlet portion 565 sloped gently into the sea surface below the depth of the mean sea level. Design considerations may include an additional horizontal distance between the entrance 585 to the conical structure 515 housing the unidirectional turbine 590 and sectional inlet 565. This horizontal distance provides room for waves to maintain the same flow, height, and regularity as outside the chamber.

The waves from the open sea 505 strike the concrete structure or earth-based foundation 510 and subsequently reach the inlet 585 of the unidirectional turbine 590. The sectional inlet 565 directs the waves into the air-tight chamber, while the air vents 520 and 525 open to allow exit of air trapped in the chamber 580 and being pushed out by the incoming waves, the exit of air occurring through the unidirectional turbine blades. The unidirectional turbine blades may be configured to rotate at a speed of 15 to 20 rpm (revolutions per minute). For the purposes of illustration in the exemplary embodiments herein, the discussion includes a single wave and extrapolation of the single wave concept is typically acceptable. The air-tight chamber includes air that was previously existent in the chamber from the previous wave sections cycled out of the chamber, thereby creating suction. The vents 520 and 525 allow air into the chamber (shown by the vent arrows), where the inlet air contributes to the angular inertia of the rotating unidirectional turbine, thereby keeping the turbine rotating, even at a lower angular velocity. New inlet waves in the air-tight chamber causes the existent air in the chamber to push out through the blades of the unidirectional turbine 590, and through the air vents 520-525, thereby making the blades rotate in the same direction, as during the suction cycle.

The unidirectional turbine 590 in conical housing 585 is coupled to, either an axial flow a hydraulic pump 570B via high speed gears 570A. The hydraulic oil pump 570B may be a swash type variable flow hydraulic pump. The hydraulic pump structure may also include high speed gear box 570A and pump structure 570B. The concrete structure or earth-based foundation 510 in system 500 supports the hydraulic pump 570 and the conical housing 515 at height of about 10-30 meters over a closed hydraulic oil tank 560 holding the momentum-transfer fluid of choice, such as, hydraulic oil in this example. In an exemplary embodiment, the unidirectional turbine is configured to rotate at a speed of 15 to 20 rpm as a result of the wave energy. Further, the high speed gear 570A may be set to a ratio of 1:100, thereby enabling the swash type hydraulic pump to function at a maximum speed of 1500 rpm. Accordingly, hydraulic oil from the tank 560 may be delivered to a series connected hydraulic motors 545 in the same horizontal plane for energy generation at varying pressures. For simplicity only a single hydraulic motor is shown in the horizontal plane including motor 545. Exemplary pressure values that may be pre-set into the hydraulic motors, via the valves 530D are 30 bar, 30.5 bar, and 31 bar. The tank 560 includes ventilation in the form a controlled air vent over the top part of the tank. The end of the suction line 595A, between the pump 570B and the tank 560 is regulated by a valve 530A, where the valve 530A may be set to 32 bar to provide relief if the pressure in the supply line 595B is higher than the rated pressure for the hydraulic motors 545. The pump 570 transfers the fluid from the tank 560 to the high pressure (small diameter) fluid distribution pipeline 535 via the main supply line 595 including valve 530B. Valve 530A may be set to monitor the pressure in the supply line 595B and supply valve 530D as a result of the changing wave forces and changing speeds of the unidirectional turbine output.

A control system implementation may monitor the statuses of valves 530A-530D. The status of valves 530B-C may be input to a feedback or a feed forward module of the control system for determination of the hydraulic motors choice from the multiple hydraulic motors arrangement 545A-C, thereby automatically adjusting the appropriate differential pressure valves 530D for turbine selection according to fluid in the main supply line 595. A plan view for the multiple hydraulic motors arrangement 545A-C is illustrated in the plan view of FIG. 6. The fluid distribution pipeline 535 includes a collection of evenly spaced differential pressure valves connecting to a subsidiary pipelines leading to the hydraulic motors 545A-C. Alternatively, the main supply pipeline 595B including valve 530B may connect directly to the multiple, evenly spaced, subsidiary pipelines neighboring each other in the same horizontal plane, and leading to the hydraulic motors 545.

Each subsidiary pipeline from pipeline 535 to hydraulic motors 545 includes a differential pressure valve 530D at the junction of the turbine and the pipeline 535. In certain exemplary embodiments, the pipeline 535 includes a system for automatic pneumatic control of the differential pressure valves 530D depending on the flow rate of the fluid from valve 530B on the side of the unidirectional turbine 590. The exemplary design of the systems disclosed herein ensures that each hydraulic motors 545A-C functions according to specified input fluid flow rate, while generating a fixed electrical output. The combination of valves 530B-C and the parallel connections from 545A-C ensure that the hydraulic motors 545 maintain a standard rotation rate, irrespective of the wave's entry/exit rates at the mouth of the air-tight chamber inlet 565.

One or more direct current (DC) generators may be coupled to the three exemplary generator turbines via connecting belt 550, where the belt 550 may be three separate connecting belts, or a single, clutch-adjustable belt for engaging one of the three generator turbines. In another exemplary embodiment, a DC generator connects to each generator turbine and a generator room, depicted by block 555 in FIG. 5 houses the entire DC generator block, including, alternatively, the multiple generator turbine arrangement. The discharged or spent hydraulic oil from the hydraulic motors transfers, via a low pressure and large diameter pipeline 540 back into the system 500 via supply line 595D, where the spent hydraulic oil is water cooled using a heat-exchanger or a hydraulic oil cooler 600 and maintained at between 45° C. and 55° C. with the help of an automated thermostat monitor. Further, using hydraulic oil as a momentum transfer fluid ensures a high direction pressure system that may be closed to external effects. Accordingly, as the supply pipelines are under constant pressure in a closed environment, there is little to no room for incorrect flow distribution to the hydraulic motors, especially when the hydraulic oil system 500 is embedded in an offshore system, such as the ship in FIG. 2 or the rig in FIG. 3.

FIG. 6 illustrates a plan view 605 of series-connected generator turbines, Kaplan turbines, or hydraulic motors in a single horizontal plane, in accordance with certain exemplary embodiments discussed with respect to FIGS. 1-5 above.

General

The exemplary methods and systems described in this disclosure are illustrative, and, in alternative embodiments, certain steps can be performed in a different order, in parallel with one another, omitted entirely, and/or combined between different exemplary embodiments, and/or certain additional acts can be performed, without departing from the scope and spirit of this disclosure. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A system for optimizing wave energy for generation of renewable energy on onshore and offshore platforms, the system comprising:
   a step-up gearbox coupled to receive a low speed axle from an external turbine, wherein the gearbox comprises step-up gears and a high speed axle to step-up the input angular velocity from the low speed axle to a high angular velocity;
   a fluid pump coupled to the high speed axle, for using the high angular velocity of the high speed axle to suction a momentum-transfer fluid from a momentum-transfer fluid source;
   a plurality of evenly-spaced delivery pipelines in a single horizontal plane, wherein each delivery pipeline horizontally neighbors other delivery pipelines and wherein each delivery pipeline comprises a differential pressure valve for allowing a pre-determined input pressure of the suctioned momentum-transfer fluid to one of a plurality of generator turbines; and
   the plurality of generator turbines connected to at least one DC or at least one AC generator for conversion of the angular velocity from each of the generator turbines to electricity.

2. The system according to claim 1, wherein the external turbine is a unidirectional turbine, the unidirectional turbine fixed on or suspended from the onshore or offshore platform.

3. The system according to claim 2, wherein the unidirectional turbine is rotated responsive to a change in air pressure, the change in air pressure as a result of a change in momentum of set of waves within an air-tight chamber.

4. The system according to claim 1, further comprising:
a low pressure output pipeline from each of the plurality electric generator turbines, the low pressure output pipeline comprising spent momentum-transfer.

5. The system according to claim 1, further comprising:
an anchored base platform comprising an input unidirectional turbine housed in an air-tight chamber, wherein the air-tight chamber is sealed via an open sectioned inlet under the mean sea level, the sea proving the seal to the chamber, and
wherein the air-tight chamber comprises atmospheric air, the atmospheric air allowed into the air-tight chamber via air vents at the top of the air-tight chamber.

6. The system according to claim 1, wherein the fluid pump is one among an axial flow pump and a hydraulic pump.

7. The system according to claim 1, wherein the momentum-transfer fluid is one among fresh water, hydraulic oil, ethanol glycol, any alcohol-based fluid, and sea-water.

8. The system according to claim 1, wherein the unidirectional turbine is a wells turbine.

9. The system according to claim 1, wherein:
each of the plurality of generator turbines configured to operate at an optimal output angular velocity for each of the pre-determined input pressures.

10. The system according to claim 1, wherein the generator turbine is one of a hydraulic motor when the momentum-transfer fluid is hydraulic oil and a Kaplan turbine when the momentum-transfer fluid is sea-water or fresh water.

11. The system according to claim 1, wherein the fluid pump is one of a swash type hydraulic pump and a volute sea-water pump.

12. The system according to claim 1, wherein the step-up gearbox is configured for a step-up ratio of 1:100, the unidirectional turbine is configured to rotate at 15 to 20 revolutions per minute (rpm), and the fluid pump is configured to function at a maximum speed of 1500 rpm.

13. A system for optimizing wave energy for generation of renewable energy on onshore and offshore platforms, the system comprising:
an anchored base platform comprising an input wells turbine within a air-tight chamber, the chamber sealed on one side by sea-water from an open sectioned inlet under the mean sea level, wherein the air-tight chamber comprises atmospheric air from air vents above the chamber;
a unidirectional turbine with symmetrical blades and a low speed axle for rotation in a single direction, wherein the turbine and the low speed axle is rotated as a result of the change in the air pressure in the air-tight chamber;
a step-up gearbox coupled to receive the low speed axle from the unidirectional turbine, wherein the gearbox comprises step-up gears and a high speed axle to step-up the input angular velocity from the low speed axle to a high angular velocity;
a fluid pump coupled to the high speed axle, for using the high angular velocity of the high speed axle to suction a momentum-transfer fluid from a momentum-transfer fluid source;
a plurality of evenly-spaced delivery pipelines in a single horizontal plane, wherein each delivery pipeline horizontally neighbors other delivery pipelines and wherein each delivery pipeline comprises a differential pressure valve for allowing a pre-determined input pressure of the suctioned momentum-transfer fluid to one of a plurality of generator turbines; and
the plurality of generator turbines connected to at least one DC or at least one AC generator for conversion of the angular velocity from each of the generator turbines to electricity.

14. The system according to claim 13, wherein the change in the air pressure in the air-tight chamber is responsive to an air vent opening for inlet during a wave exit cycle, and an air vent opening for outlet during the wave entry cycle, the air vent located at the top of the air-tight chamber and at an outlet position of the unidirectional turbine.

15. The system according to claim 13, further comprising:
a low pressure output pipeline from each of the plurality electric generator turbines, the low pressure output pipeline comprising spent momentum-transfer fluid.

16. The system according to claim 13, wherein the fluid pump is one among an axial flow pump and a hydraulic pump.

17. The system according to claim 13, wherein the momentum-transfer fluid is one among fresh water, hydraulic oil, ethanol glycol, any alcohol-based fluid, and sea-water.

18. The system according to claim 13, wherein the unidirectional turbine is a wells turbine.

19. The system according to claim 13, further comprising:
each of the plurality of generator turbines configured to operate at an optimal output angular velocity for each of the pre-determined input pressures.

20. The system according to claim 13, wherein the generator turbine is one of a hydraulic motor when the momentum-transfer fluid is hydraulic oil and a Kaplan turbine when the momentum-transfer fluid is sea-water or fresh water.

21. The system according to claim 13, wherein the fluid pump is one of a swash type hydraulic pump and a volute sea-water pump.

22. The system according to claim 13, wherein the step-up gearbox is configured for a step-up ratio of 1:100, the unidirectional turbine is configured to rotate at 15 to 20 revolutions per minute (rpm), and the fluid pump is configured to function at a maximum speed of 1500 rpm.

* * * * *